United States Patent [19]
Skudera, Jr.

[11] Patent Number: 5,388,121
[45] Date of Patent: Feb. 7, 1995

[54] MODIFIED CHIRP-Z PULSE DETECTOR

[75] Inventor: William J. Skudera, Jr., Oceanport, N.J.

[73] Assignee: The United States of America as represented by the Secretary of the Army, Washington, D.C.

[21] Appl. No.: 233,561

[22] Filed: Apr. 25, 1994

[51] Int. Cl.⁶ ............................................. H04L 27/30
[52] U.S. Cl. ..................................................... 375/1
[58] Field of Search ............... 375/1; 324/76.19, 76.23

[56] References Cited

U.S. PATENT DOCUMENTS

| | | | |
|---|---|---|---|
| H1,331 | 7/1994 | Skudera, Jr. ................... | 324/76.23 |
| 4,994,740 | 2/1991 | Skudera, Jr. et al. ........... | 324/76.19 |
| 5,257,284 | 10/1993 | Skudera, Jr. et al. ........... | 375/1 |
| 5,295,151 | 3/1994 | Skudera, Jr. et al. ........... | 375/1 |

Primary Examiner—Salvatore Cangialosi
Attorney, Agent, or Firm—Michael Zelenka; John M. O'Meara

[57] ABSTRACT

A circuit is disclosed for deriving a modified Chirp-Z transform that focuses on a narrow bandwidth within a solitary time interval and thereby assures RF pulse detection with the characteristic gain of conventional Chirp-Z transforms. RF pulse detection bandwidth enhancement is accomplished with this circuit by arranging it in a plurality of parallel channels which each relate to one RF pulse frequency within that bandwidth.

7 Claims, 1 Drawing Sheet

MODIFIED CHIRP-Z PULSE DETECTOR

GOVERNMENT INTEREST

The invention described herein may be manufactured, used, and licensed by or for the United States Government for governmental purposes without payment to me of any royalties thereon.

BACKGROUND OF THE INVENTION

The present invention relates to the field of COMINT/ELINT (Communications Intelligence/Electronic Intelligence) signal processing, and more particularly to the detection of RF pulses.

Pulses which contain discontinuous waveforms having specific frequency characteristics, are often referred to as RF pulses even though such characteristics are not limited to the conventional radio frequency bandwidth. As is well known in the art, such RF pulses, can be detected with a conventional Chirp-Z analyzer. Such analyzers are designed to operate over a substantial bandwidth and function to present a forward (hereinafter dynamic) Chirp-Z transform containing the individual frequency components of a composite continuous wave (CW) signal, in a frequency segregated time domain. Each RF pulse is applied at one input of a mixer and output from an impulse driven expansion filter is applied at the other mixer input. A sweeping local oscillator (hereinafter SLO) is commonly utilized as the expansion filter and output from the mixer is directed to a compression filter from which the dynamic Chirp-Z transform is derived. In conventional Chirp-Z analyzers however, the dispersion of the expansion filter (SLO sweep time) is much greater than the duration of many RF pulses and the gain inherent to the dynamic Chirp-Z transform drops off in proportion with the difference existing therebetween. Other types of analyzers for detecting RF pulses are well known but ringing and distortion problems are inherent thereto, and little if any gain is possible therewith.

SUMMARY OF THE INVENTION

It is the general object of the present invention to derive a modified Chirp-Z transform for detecting RF pulses having predetermined frequency characteristics, without incurring gain deterioration.

It is a specific object of the present invention to utilize the modified Chirp-Z transform of the above-stated general object for detecting RF pulses over a wide bandwidth.

It is a more specific object of the present invention to enhance the gain derived with the modified Chirp-Z transform of the above-stated general object.

These and other objects are accomplished in accordance with the present invention by altering conventional Chirp-Z circuitry. Although output from an expansion filter is applied to one input of a mixer and output from the mixer is applied to the input of a compression filter as in conventional chirp-Z circuitry, a local oscillator is applied to the other input of the mixer and the signal relative to which the RF pulse occurs is applied to the input of the expansion filter. The center frequency of the compression filter is matched to that of the RF pulse regarding which detection is desired, and the modified Chirp-Z transform of the RF pulse results at the output of that filter. To expand the bandwidth of RF pulse detection, the desired bandwidth is segmented into specific frequencies at predetermined intervals and each such frequency is detected with a separate modified Chirp-Z transform circuit. Gain enhancement relative to such a modified Chirp-Z transform is accomplished by applying that transform to dynamic Chirp-Z transform circuitry.

The scope of the present invention is only limited by the appended claims for which support is predicated on the preferred embodiments set forth hereafter in the following description and the attached drawings wherein like reference characters relate to like parts throughout the several figures.

DESCRIPTION OF THE PREFERRED EMBODIMENTS

Figure 1:
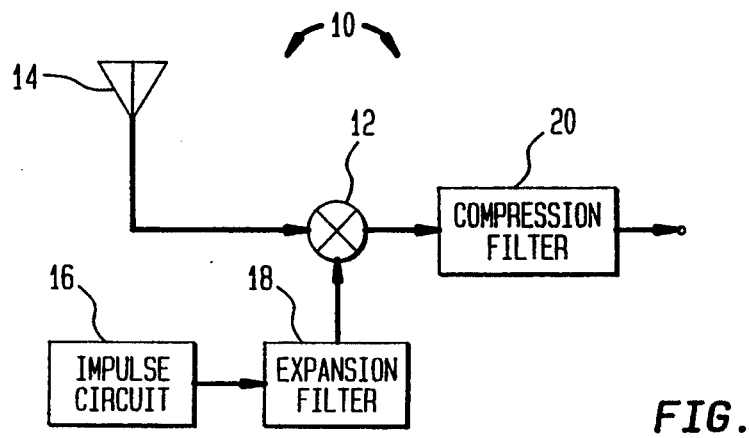
FIG. 1 is a block diagram for a conventional dynamic Chirp-Z transform circuit.

The circuit 10 shown in FIG. 1 derives a conventional Chirp-Z transform for signals applied thereto. Such signals are directed to one input of a mixer 12 from an antenna 14 or some other source, such as another circuit. An impulse is applied by a circuit 16 to the other input of the mixer 12, through an expansion filter 18, such as a SLO. Output from mixer 12 is directed to a compression filter 20 from the output of which the conventional dynamic Chirp-Z transform passes to a post mixer (notshown), which functions to strip the chirp parameter in single path processors. When a composite signal of individual continuous wave components is applied to circuit 10, such components are compressed into segregated time intervals of equal duration within this transform. Each continuous wave component has a single frequency characteristic and its time interval appears once in each transform. Therefore, each such transform relates to a sequence of several frequencies and although those skilled in the Chirp-Z art know it as a "forward" transform, it is referred to as a "dynamic" transform for purposes of this specification. A gain is inherent to circuit 10 and consequently each of the continuous wave components is magnified during its time interval within the dynamic transform.

Figure 2:
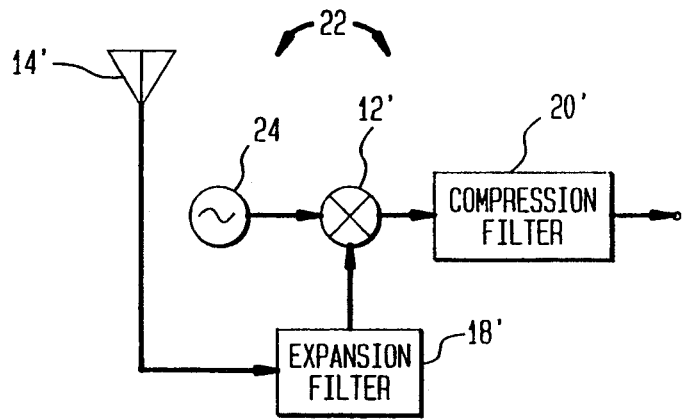
FIG. 2 is a block diagram for the modified Chirp-Z transform circuit of the present invention.

To avoid ringing and distortion when detecting RF pulses within signals, dynamic Chirp-Z transforms are often utilized. However, the RF pulse duration must be compatible with the dispersion of the expansion filter 18, if gain is to be accomplished using dynamic Chirp-Z transforms. Furthermore, such detection becomes impossible when a large disparity exists therebetween. These concerns become unimportant when a modified Chirp-Z transform in accordance with the present invention is utilized to detect RF pulses in signals. Such a transform is derived with a circuit 22, as shown in FIG. 2. The signals are directed from an antenna 14' or some other source to one input of a mixer 12' through an expansion filter 18' which is selected to have a center frequency substantially equal to that of the RF pulse regarding which detection is desired. Output from a local oscillator 24 is applied to the other input of mixer 12', from which the output is directed to a compression filter 20'. Power output from the local oscillator 24 must be sufficient to saturate the mixer 12'. Otherwise, the center frequency of compression filter 20' is fixed at the center or characteristic frequency of the RF pulse to be detected and the center frequency of the compression filter 20' is fixed at the output frequency of mixer 12', which is the resultant of the frequencies being applied thereto by the expansion filter 18' and the local oscillator 24. When RF pulses are directed to circuit 22 therefore, only those pulses having a characteristic frequency equal to the center frequency of the expansion filter 18', will appear in the modified Chirp-Z transform which passes from the output of the compression filter 20'. Because the time duration of this modified Chirp-Z transform is substantially equal to the reciprocal of the bandwidth over which expansion filter 18' operates, the width of the RF pulse as it appears therein is much greater than when it appeared at the input to the expansion filter 18'. Also, the RF pulse is magnified in this transform by a gain comparable to that realized with dynamic Chirp-Z transforms, because the compression filter 20' in FIG. 2 functions to integrate energy in the same manner as the compression filter 20 in FIG. 1. Since the positions in time of the frequencies contained in this modified Chirp-Z transform do not vary as they do for a dynamic Chirp-Z transform, it is hereinafter referred to as a "static" Chirp-Z transform.

Although a narrow band of frequencies is included in the RF pulse frequency characteristic, the detectable bandwidth of the static Chirp-Z transform circuit 22 in FIG. 2 is limited. However, the expansion filter 18', local oscillator 24 and compression filter 20' therein can be modified to have variable frequency characteristics which are controllable in accordance with the desired RF pulse frequency characteristic to be detected. Furthermore a plurality of static Chirp-Z transform circuits 22 can be arranged in various ways to detect the frequency characteristic of more than one RF pulse and thereby broaden the bandwidth of detection. Before any such arrangement can be implemented, both the desired bandwidth of detection and the specific pulse frequency characteristics to be detected therein must first be established. Then static Chirp-Z transform circuits 22 for the RF pulse frequency characteristics selected, are arranged in parallel channels, with signals being applied thereto from a common source such as the antenna 14' shown in FIG. 3. Each channel detects one pulse frequency characteristic and in one embodiment, signals are applied directly to the static Chirp-Z transform circuits 22 therein. All the circuits 22 detect a common RF pulse frequency characteristic in another embodiment wherein signals are applied to the static Chirp-Z transform circuit 22 in each channel through a means 26 for converting the RF pulse frequency characteristic detected by that channel to the common pulse frequency characteristic. The preferred embodiment of each frequency converting means 26 includes a mixer 28 and a fixed frequency source 30 with the frequency of the latter being equal to the RF pulse frequency characteristic detected by that channel, minus the common RF pulse frequency characteristic detected by the static Chirp-Z transform circuit 22. One mixer input has the frequency of the source 30 applied thereto and the other mixer input has the Rf pulse signals from the antenna 14' applied thereto. Output from the mixer 28 is connected to the input of the expansion filter 18' (not shown by FIG. 3) in the static Chirp-Z transform circuit 22.

Figure 3:
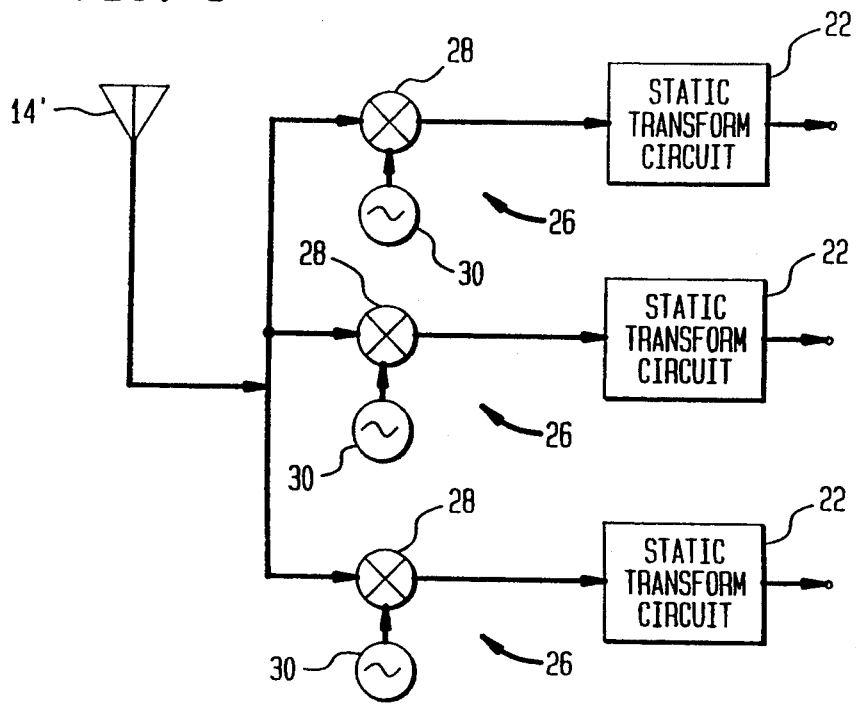
FIG. 3 is a block diagram for a wide bandwidth embodiment of the present invention.

Due to signal power splitting in the parallel channel arrangement of FIG. 3, losses are encountered relative to each RF pulse frequency characteristic detected. Compensation for such losses can be incorporated in each channel of FIG. 3 by connecting the output from compression filter 20' in each static Chirp-Z transform circuit 22 to at least one dynamic Chirp-Z transform circuit. As mentioned previously, gain is inherent with dynamic Chirp-Z transform circuits. However, the duration of the waveform to be magnified must be matched to the bandwidth of the expansion filter in the dynamic Chirp-Z transform circuit. Consequently, the width of the pulse output from the compression filter 2' in each static Chirp-Z transform circuit 22 of FIG. 3 must be matched to that bandwidth.

Those skilled in the art will appreciate without any further explanation that within the concept of this invention many modifications and variations are possible to the above disclosed embodiments of RF pulse detection circuitry. Consequently, it should be understood that all such modifications and variations fall within the scope of the following claims.

What I claim is:

1. A static Chirp-Z transform circuit for detecting an RF pulse in signals applied thereto, at a gain substantially equal to that realized with dynamic Chirp-Z transform circuits, comprising:
   a mixer having two inputs and one output;
   an oscillator having a fixed output frequency which is applied to one input of the mixer;
   an expansion filter having an input and an output with the latter being connected to the other input of the mixer; and
   a compression filter having an input and an output with the former being connected to the output of the mixer and the static transform being presented at the latter when the signals are applied to the input of the expansion filter.

2. The circuit of claim 1 wherein an antenna applies the signals to the input of the expansion filter.

3. The circuit of claim 1 wherein the static Chirp-Z transform gain is enhanced by connecting the compression filter output to at least one dynamic Chirp-Z transform circuit.

4. A plurality of static Chirp-Z transform circuits in accordance with claim 1, each such circuit being disposed in a channel dedicated to the detection of a particular RF pulse frequency characteristic and such channels being arranged in parallel to expand the bandwidth of RF pulse detection.

5. The RF pulse detection circuitry of claim 4 wherein the signals are applied directly to each static Chirp-Z transform circuit which is specifically arranged to detect the particular RF pulse frequency characteristic of its channel.

6. The RF pulse detection circuitry of claim 4 wherein the static Chirp-Z transform circuits detect a common RF pulse frequency characteristic and the signals are applied to each channel through a means for converting the dedicated RF pulse frequency characteristic of that channel to the common RF pulse frequency characteristic.

7. The RF pulse detection circuitry of claim 6 wherein each frequency converting means includes a fixed frequency source and a mixer having two inputs and one output, one mixer input having the frequency source applied thereto while the signals are applied to the other mixer input and the mixer output is connected to the expansion filter input in the static Chirp-Z transform circuit to which that frequency converting means relates, and the source frequency is equal to the dedicated RF pulse frequency of the channel in which that frequency converting means is disposed, minus the common RF pulse frequency characteristic.

* * * * *